(12) United States Patent
Hensbergen

(10) Patent No.: US 7,000,027 B2
(45) Date of Patent: Feb. 14, 2006

(54) SYSTEM AND METHOD FOR KNOWLEDGEABLE NODE INITIATED TCP SPLICING

(75) Inventor: Eric Van Hensbergen, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 704 days.

(21) Appl. No.: 09/998,048

(22) Filed: Nov. 29, 2001

(65) Prior Publication Data

US 2003/0101273 A1 May 29, 2003

(51) Int. Cl.
*G06F 15/173* (2006.01)
(52) U.S. Cl. ...................................... 709/239; 709/238
(58) Field of Classification Search ........ 709/227–229, 709/238–239, 242
See application file for complete search history.

(56) References Cited

U.S. PATENT DOCUMENTS

| | | | | |
|---|---|---|---|---|
| 5,675,732 A | | 10/1997 | Majeti et al. ........... | 395/200.01 |
| 5,774,660 A | * | 6/1998 | Brendel et al. ............ | 709/201 |
| 5,828,840 A | | 10/1998 | Cowan et al. .............. | 395/200 |
| 5,941,988 A | | 8/1999 | Bhagwat et al. ........... | 713/201 |
| 6,212,563 B1 | | 4/2001 | Beser ........................ | 709/227 |
| 6,236,655 B1 | * | 5/2001 | Caldara et al. ........ | 370/395.31 |
| 6,249,523 B1 | | 6/2001 | Hrastar et al. ............. | 370/401 |
| 6,252,878 B1 | * | 6/2001 | Locklear et al. ........... | 370/401 |
| 6,421,711 B1 | * | 7/2002 | Blumenau et al. ......... | 709/213 |
| 6,510,164 B1 | * | 1/2003 | Ramaswamy et al. ..... | 370/466 |
| 6,546,425 B1 | * | 4/2003 | Hanson et al. ............. | 709/227 |
| 6,601,101 B1 | * | 7/2003 | Lee et al. ................... | 709/227 |
| 6,763,007 B1 | * | 7/2004 | La Porta et al. ........... | 370/331 |
| 6,826,613 B1 | * | 11/2004 | Wang et al. ................ | 709/227 |
| 2002/0068588 A1 | * | 6/2002 | Yoshida et al. ............. | 455/461 |
| 2002/0188730 A1 | * | 12/2002 | Tang et al. ................. | 709/227 |
| 2002/0188740 A1 | * | 12/2002 | Tang et al. ................. | 709/230 |
| 2002/0188753 A1 | * | 12/2002 | Tang et al. ................. | 709/237 |
| 2003/0065711 A1 | * | 4/2003 | Acharya et al. ........... | 709/203 |

OTHER PUBLICATIONS

Daniel Kovacs, "Tutorial on Linked Lists", 1998, Web Page, Retrieved from http://www.fortunecity.com/skyscraper/false/780/linklist.html on Jan. 19, 2005.*
Wenting Tang, Ludmila Cherkasova, Lance Russell, and Matt Mutka, "Modular TCP Handoff Design in STREAMS-Based TCP/IP Implementation", Jul. 9-13, 2001, Proceedings of the First International Conference on Networking-Part 2, p. 71-81.*

(Continued)

*Primary Examiner*—Glenton B. Burgess
*Assistant Examiner*—Aaron Strange
(74) *Attorney, Agent, or Firm*—VanLeeuwen & VanLeeuwen; Casimer K. Salys

(57) ABSTRACT

A system and method utilizes back-end nodes to determine which node should handle an incoming requests and then utilizes the front-end switch to splice one or more connections between the client and the chosen node. Chosen nodes can repeatedly handoff the connection to other nodes to handle the client's requests. The front-end switch provides the initial client connection to back-end nodes in a round-robin approach distributing initial connections among the back-end nodes. A proxy application on the back-end node accepts the connection, parses the request, and determines which back-end node should handle the request. If another back-end node should handle the request, the back-end node currently connected to the client performs a handoff to the target back-end node. The switch splices the initial connection to a connection to the selected node and modifies subsequent packet headers appropriately in order to map the two connection states to one another.

20 Claims, 8 Drawing Sheets

OTHER PUBLICATIONS

Althanasious Papathanasiou and Eric Van Hensbergen, "KNITS: Switch-based Conenction Hand-off", Jun. 23-27, 2002, In Proc. of IEEE INFOCOM 2002, vol. 1, pp.: 332-341.*

Althanasious Papathanasiou, "Althanasious Papathanasiou", Nov. 18, 2004, Web Page, Retreived from http://www.cs.rochester.edu/u/papathan/resume/2004-11-18/html/resume.html on Jan. 19, 2005.*

Ravi Kokku, Ram Rajamony, Lorenzo Alvisi and Harrick Vin, "Half-pipe Anchoring: An Efficient Technique for Multiple Connection Handoff", Nov. 2002, In the 10th International Conference on Network Protocols (ICNP 2002).*

Bhagwat et al., "TCP Slicing for Application Layer Proxy Performance".

Aron, et al., "Scalable Content-aware Request Distributio in Cluster-based Network Servers," Proc. of the 2000 Annual Usenix Tech. Conf., San Diego, CA, Jun. 2000.

* cited by examiner

SYSTEM AND METHOD FOR KNOWLEDGEABLE NODE INITIATED TCP SPLICING

BACKGROUND OF THE INVENTION

1. Technical Field

The present invention relates in general to a system and method for splicing connections through a network switch or router. More particularly, the present invention relates to a system and method having nodes determine handling of client requests and initiate TCP splicing.

2. Description of the Related Art

The enormous growth of the Internet has created substantial workloads for Internet data centers. Content providers often address this workload by employing large numbers of servers which are often in rack-mounted configurations. With the global Internet population predicted to double over the next few years, the ability to rapidly scale services is an important factor for content providers.

When serving some types of content, such as static content, scalability can be addressed by using distributed requests based on the content being requested. For example, a content provider may have certain content stored on one server, or group of servers, and other types of content stored on another server, or another group of servers. Some mechanisms attempt to service requests using servers where the requested data is readily available, often within the server's memory or within the server's processor data cache. These attempts have lead to the development of "layer-7" switching (also known as "application layer switching"). In layer-7 switching, the edge-switch parses the incoming request and determines to which back-end server the request should be dispatched.

Handling layer-7 switching at the switch presents various challenges. The incoming connection is accepted by the switch and the request is received, parsed, and the route resolved to the server (also known as the "back-end node" or simply "node"). The switch then performs network translations, or TCP splicing, to connect the requester with the designated back-end node. One challenge is that these additional operations are inefficiently processed by the highly parallel, pipeline architecture of typical switching hardware. An additional challenge is that the switching hardware is burdened by continually monitoring connections to determine whether subsequent requests should be dispatched to different back-end servers.

What is needed, therefore, is a system and method in which the front-end switch handles header manipulation and packet forwarding while the back-end nodes perform the application layer routing decisions.

SUMMARY

It has been discovered that the aforementioned challenges are overcome using a system and method that uses the back-end nodes (servers) to determine which node should handle the incoming request and then utilizes a switch (gateway) to effectuate a connection between the client and the chosen node. In this manner, chosen nodes can repeatedly handoff the connection to the client to other nodes which are better suited to respond to the client's requests.

The front-end switch provides the initial client connection to back-end nodes in a round-robin or other approach that distributes initial connections to a variety of back-end nodes. A proxy application on the back-end node accepts the connection, parses the request, and determines which back-end node should handle the request. If another back-end node is better suited to handle the request, the back-end node currently connected to the client performs a handoff to the target back-end node.

The current node hands the connection off to the target back-end node by opening a connection to the target back-end node and then notifying the switch. The switch splices the initial connection to the newly opened connection and modifies subsequent packet headers appropriately in order to map the two connection states to one another. In this manner, the client directs packets to the first node. The switch determines that the first node handed the connection off to a second node and maps the packet so that it is received by the second node. In addition, reverse mapping occurs so that packets sent by the second node are directed back to the client.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
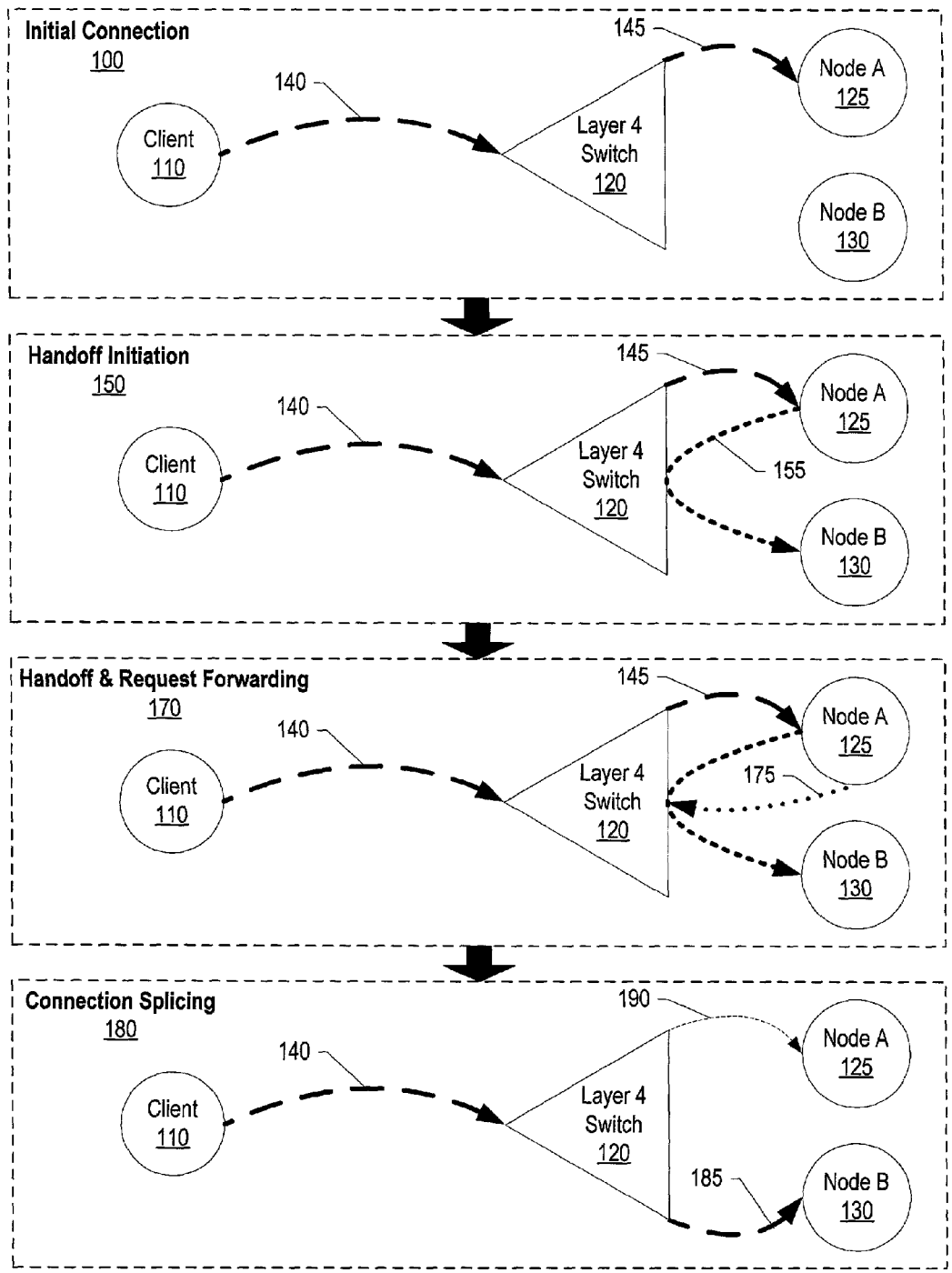
FIG. 1 is a high level sequence diagram showing the handoff of a connection.

FIG. 1 is a high level sequence diagram showing the handoff of a connection. Frame 100 shows the initial connection between client 110 and a node. In the example shown, client 110 sends request 140 to a destination, such as a Web site, that includes switch 120, node A (125), and node B (130). Switch 120 is programmed to distribute new, or initial, requests from clients to nodes in a distributed fashion, such as a round-robin approach, whereby incoming requests are scattered among available nodes. In addition, while only two nodes are shown for simplicity, the destination site may include any number of nodes. In the example shown, switch 120 opens connection 145 to node A (125). Node A (125) accepts connection 145 and determines whether to handle the client request or handoff the client request to another node.

Frame 150 shows handoff initiation. In this example, node A (125) has determined that node B (130) is better suited to handle client request 140. Node A (125) opens connection 155 to node B (130) through switch 120.

Frame 170 shows handoff and request forwarding processing. Node A (125) sends handoff request 175 to switch 120 informing to map the handoff from node A (125) to node B (130). Node A (125) also forwards the client's original request to node B (130) through connection 155. Switch 125 processes handoff request 175 and updates mapping tables in order to splice the clients original connection 140 to node B (130) as node B (130) will handle subsequent requests from client 110. In addition, reverse mapping data is stored in mapping tables to redirect node B's responses back to client 110.

Frame 180 shows the resulting connections in place after switch 120 has spliced the client's original connection 140 to node B (130) with splice connection 185. New requests from client 110 will be redirected by switch 120 to node B (130) over splice connection 185. Switch 120 keeps track of sequence data to determine whether a request received from client 110 should be redirected to node B (130) or if such packets are acknowledgements and re-send requests that should still be sent to node A (125). To accomplish this, switch 120 maintains legacy connection 190 between client 110 and node A (125). The switch manages mapping tables (see FIG. 2 for an example) to determine which node should receive the client request. For example, if node A (125) handed the connection off to node B (130) at sequence number 1000, then client packets with sequence numbers greater than 1000 would be redirected over splice connection 185 to node B (130), while client packets with sequence numbers less than 1000 would be directed over legacy connection 190 to node A (125). After a certain amount of time, a TCP_WAIT event occurs on legacy connection 190 at which time the connection to node A (125) is closed.

Node B (130) can, in turn, hand off the connection to other nodes (e.g., node "C") following the same process described above. In this manner, connection to the client can be repeatedly redirected to a particular node that is better suited to handle the client's requests.

Figure 2:
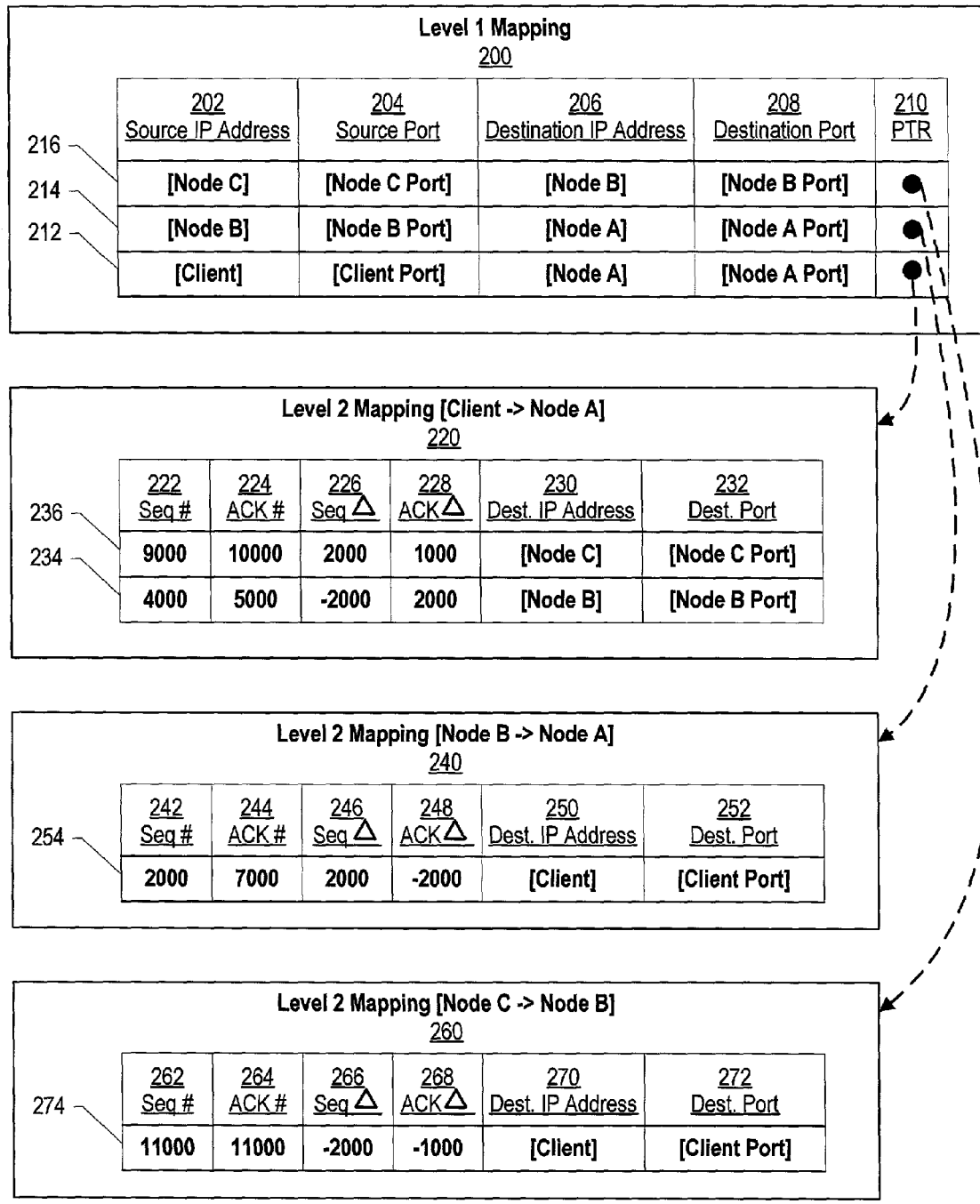
FIG. 2 is a mapping diagram showing data maintained by the switch to map connections.

FIG. 2 is a mapping diagram showing data maintained by the switch to map connections. Level 1 mapping table 200 and level 2 mapping tables (220, 240, and 260) are stored in memory accessible by the switch. Data is stored in these tables to record and manage handoff events between nodes. Data entries shown in the tables have later entries stored at the top of the table with earlier entries being lower in the table.

In the example shown, two handoffs have been performed. The client's original connection was to node A. Node A subsequently initiated a handoff of the connection to node B. Finally, node B initiated a handoff of the client's connection to node C. As explained in FIG. 1, any number of handoffs from one node to another can take place. Details of the types of mapping data maintained to splice connections is shown here in FIG. 2.

Level 1 mapping table 200 is used to record and manage redirected connections. Data maintained by level 1 mapping table 200 includes source IP address 202, source port number 204, destination IP address 206, destination port number 208, and level 2 mapping pointer 210 which points to the level 2 map corresponding to a given level 1 mapping entry.

Level 2 mapping tables (220, 240, and 260) each keep track of handoff data pertaining to one of the entries in level 1 mapping table 200 so that each level 1 mapping entry has a corresponding level 2 mapping table. Data maintained in level 2 tables includes the following data: (i) sequence numbers (columns 222, 242, and 262) at which the handoff was performed, (ii) acknowledgement numbers (columns 224, 244, and 264) at which the handoff was performed, (iii) sequence deltas (columns 226, 246, and 266) which track the differences between sequence numbers (columns 222, 242, and 262) and the sequence numbers generated for the splice connection when the splice connections were created, (iv) acknowledgement deltas (columns 228, 248, and 268) which track the differences between acknowledgement numbers (columns 224, 244, and 264) and the acknowledgement numbers generated for the splice connection when the splice connection was created, (v) destination IP addresses (230, 250, and 270), and (vi) destination port numbers (232, 252, and 272).

In the example shown, the original connection from the client was with node A. If node A does not hand the connection off to another node, entries are not needed in any of the mapping tables. However, in the example shown, node A determines that node B should handle the client request and, therefore, initiates a handoff to node B by opening a connection between node A and node B through the switch and by sending a handoff request to the switch.

The switch processes the handoff request. This processing includes writing entry 212 in level 1 mapping table 200. Entry 212 indicates that packets sent from [client] to [node A] are being redirected. The switch also creates level 2 mapping table 220 to manage the new destination address and writes a pointer in entry 212 linking entry 212 with mapping table 220. The switch also writes entry 234 in level 2 mapping table 220. Entry 234 splices the connection between [client] and [node A] to [node B] as evidenced by the [node B] destination IP address and the [node B port] destination port. In addition, the switch keeps track of which packet sequence and acknowledgement numbers are forwarded to node B. In the example shown, the handoff to node B was made at sequence number 4000 and acknowledgement number 5000 in the original connection (i.e., the connection between the client and node A).

In addition, the switch keeps track of the difference between the original connection's sequence and acknowledgement numbers and the new connection that was created to direct traffic to node B. When a new connection is created, a starting sequence number and acknowledgement number are assigned by TCP/IP rather than starting each from an initial value of 0 or 1. The sequence delta shown in entry 234 (−2000) therefore indicates that the starting sequence number assigned to the new connection is 2000 (i.e., 4000+−2000). Likewise, the acknowledgement delta shown in entry 234 (2000) therefore indicates that the starting acknowledgement number assigned to the new connection is 7000 (i.e., 5000++2000).

An additional entry is added to level 1 mapping table 200 in order to track the reverse path. The reverse path is used so that the chosen node, node B in the example, sends packets back and they are redirected to the client. In the example described above, node A opened a connection to node B to process the client request. Node B does not need to be informed of the original client address. Instead, node B responds to the request using the connection opened by node A (i.e., node B's response is directed to node A because node A opened the connection to node B). Entry 214 is added to level mapping table 200 to direct the responsive packets from node B back to the client. Entry 214 shows that packets from node B (i.e., source IP address=[node B's IP address] and source port number=[node B's port number]) and directed to node A (i.e., destination IP address=[node A's IP address] and destination port number=[node A's port number]) are redirected.

Level 2 mapping table 240 provides the detail regarding the redirected destination address. Entry 254 is added to mapping table 240 indicating that at sequence number 2000 and acknowledgement number 7000 (i.e., the starting sequence and acknowledgement numbers for the connection between node A and node B) traffic was redirected to the client (i.e., destination IP address=[client's IP address] and destination port number=[client's port number]). Delta sequence and acknowledgement numbers are also included in order to transform the sequence and acknowledgement numbers included in the node A-to-node B connection to sequence and acknowledgement numbers within the range of numbers used in the client-to-node A connection. Similar to entry 212, entry 214 in level 1 mapping table 200 also includes a pointer address to corresponding level 2 mapping table 240.

In entry 254, the sequence delta (2000) and acknowledgement delta (−2000) would be added to the sequence number and acknowledgement number (i.e., 2000 and 7000, respectively) to provide sequence numbers/acknowledgement numbers in the range used by the client-node A connection. Note that adjusting the handoff sequence/acknowledgement numbers in entry 254 by the sequence/acknowledgement deltas in entry 254 provides adjusted sequence/acknowledgement numbers of 4000 and 5000 respectively, which is the same as the handoff sequence/acknowledgement numbers found in entry 234 in level 2 mapping table 220. Likewise, adjusting the handoff sequence/acknowledgment numbers in entry 234 by the sequence/acknowledgement deltas in entry 234 provides adjusted sequence/acknowledgement numbers of 2000 and 7000, respectively, which is the same as the handoff sequence/acknowledgement numbers found in entry 254 in level 2 mapping table 240.

In the example shown in FIG. 2, data concerning an additional handoff has been processed. At some point, node B opened a connection to node C and sent a request to the switch to handoff the connection to node C similar to the way node A handed off the connection to node B as described above. The result of this handoff is the addition of entry 216 in level 1 mapping table 200 and the addition of corresponding level 2 mapping table 260. Furthermore, an additional entry 236 is added to level 2 mapping table 220.

Entry 236 is added to redirect traffic that client sends to node A (the original connection) to node C. As can be seen, the sequence number/acknowledgement number of the packets on the original connection were 9000 and 10000 respectively. Sequence and acknowledgment deltas (2000 and 1000, respectively) are included in order to transform the packet sequence/acknowledgement numbers in the original connection to packet sequence/acknowledgement numbers in the new connection from node B-to-node C.

Level 2 mapping table 260 is created and entry 274 is included in order redirect packets from node C addressed to node B to the client. The handoff sequence/acknowledgment numbers of the new connection between nodes B and C are each 11000 (i.e., when the connection between node B and C was opened, the initial sequence/acknowledgement numbers assigned by TCP/IP was near 11000) and the sequence/acknowledgement deltas are −2000 and −1000 respectively. Applying these delta values to the handoff sequence/acknowledgement numbers provides values of 9000 and 10000, which are the same handoff sequence/acknowledgement numbers found in entry 236 in level 2 mapping table 220.

The example handoffs described above result in the mappings shown in the tables in FIG. 2. When the client sends a packet on the original connection (i.e., client-to-node A), the switch matches the addresses to those shown in entry 212, so the switch follows the pointer in entry 212 to redirect the packet. Pointer 212 points to level 2 mapping table 220. The switch compares the sequence/acknowledgement numbers in the packet to the sequence/acknowledgement handoff values found in level 2 mapping table 220. If the sequence/acknowledgement numbers are above 9000/10000 (i.e., matches entry 236), then the packet is redirected to node C and the sequence/acknowledgement numbers in the packet are adjusted by 2000/1000. This redirection occurs on new packets from the client and efficiency may be improved by checking this match first. On the other hand, if the sequence/acknowledgement numbers are between 4000/5000 and 9000/10000 (i.e., a match of entry 234), then the packet is redirected to node B and the sequence/acknowledgement numbers are adjusted by 2000 and −1000, respectively, to conform to the sequence/acknowledgement numbers used in the connection to node B. This match would occur on resends or acknowledgement to packets originally sent from node B. Finally, if the sequence/acknowledgement numbers are less than 4000/5000 (i.e., no matches to any table entries) then the packet is not redirected (i.e., the packet is a re-send, acknowledgement or other type of message and should continue to the original node (node A)).

If the client packet is redirected to node C, node C receives the packet from the switch on the connection that was created connecting node B with node C. Node C's return response is therefore addressed to node B. Level 1 mapping table 200 matches the return response against entries in the table. The packet from node C to node B matches entry 216 which in turn points to level 2 mapping table 260. Level 2 mapping table 260 is used to retrieve entry 274 which includes the destination address and port number that correspond to the client, and the switch therefore redirects the packet to the client and also adjusts the sequence/acknowledgement numbers in the response packet by the delta values found in entry 274 to conform with sequence/acknowledgement numbers used in the connection with the client (i.e., the original connection between the client and node A).

If the client packet is instead redirected to node B, node B receives the packet from the switch on the connection that was created connecting node A with node B. Node B's return response is therefore addressed to node A. Level 1 mapping table 200 matches the return response against entries in the table. The packet from node B to node A matches entry 214 which in turn points to level 2 mapping table 240. Level 2 mapping table 240 is used to retrieve entry 254 which includes the destination address and port number that correspond to the client, and the switch therefore redirects the packet to the client and also adjusts the sequence/acknowledgement numbers in the response packet by the delta values found in entry 254 to conform with sequence/acknowledgement numbers used in the connection with the client (i.e., the original connection between the client and node A).

Finally, if the client packet is sent to node A, node A receives the packet from the switch on the connection that was created connecting the client to node A (i.e., the original connection). Node A's return response is therefore also addressed to the client. No match is found in Level 1 mapping table 200, so the packet is sent to the client without any redirection or sequence/acknowledgement number modifications.

Figure 3:
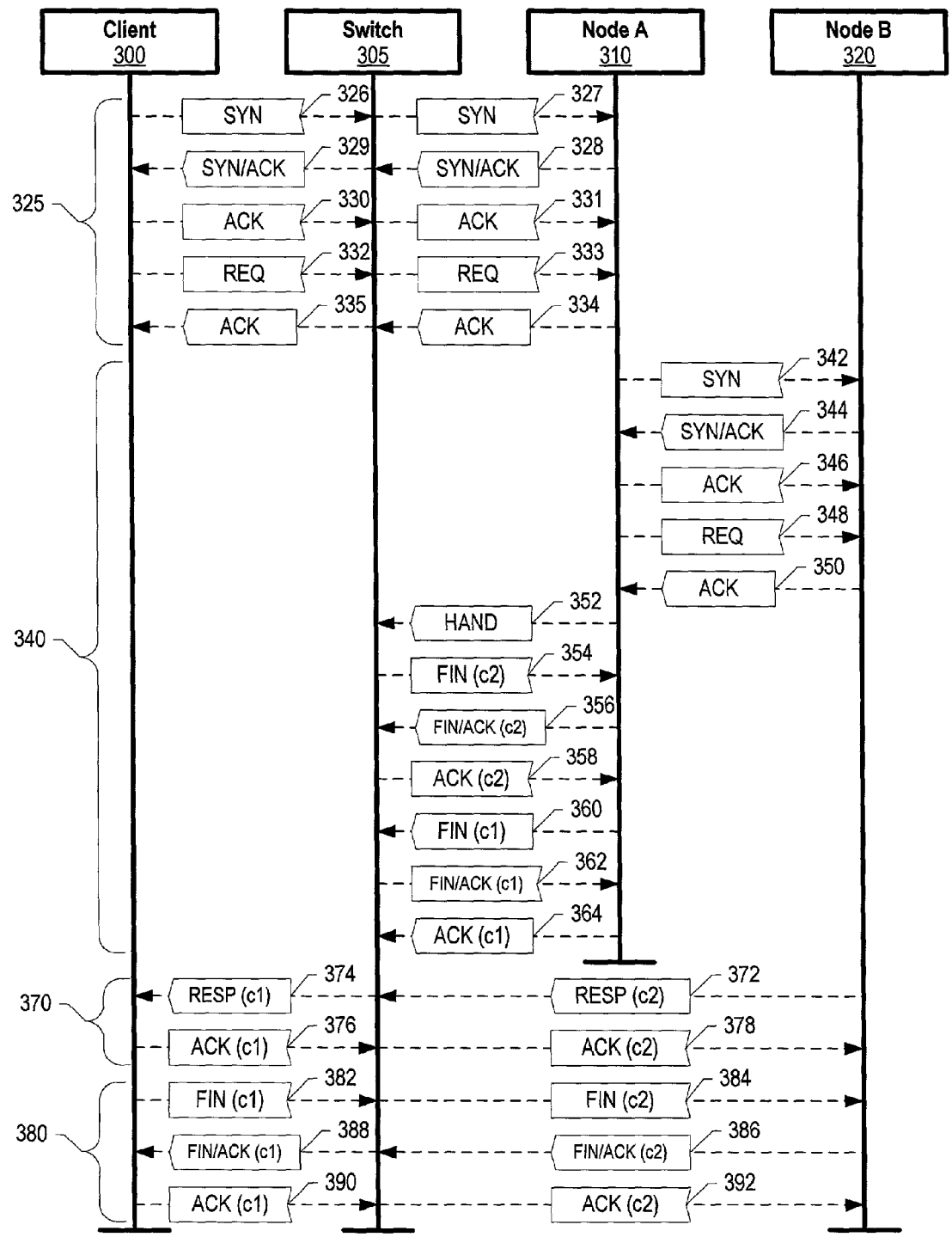
FIG. 3 is a connection handoff sequence diagram showing messages transmitted between a client, switch, and nodes to handle redistribution of requests.

FIG. 3 is a connection handoff sequence diagram showing messages transmitted between a client, switch, and nodes to handle redistribution of requests. Packets travel between client 300, switch 305, node A 310, and node B 320. Connection establishment processing 325 commences and client 300 opens a first connection (c1) with a SYN packet (packet 326) to a network address (i.e., a web site). Switch 305 receives packet 326 and determines, based on a distribution scheme, to send the request (packet 327) to node A 310 whereupon node A accepts the connection. Node A 310 acknowledges the packet with a packet that is sent to switch 305 and forwarded to the client (packets 328 and 329). Client 300 responds with ACK packet 330 which is sent to switch 305. Switch 305 forwards ACK packet 331 to node A 310. Client 300 then sends REQ (request) packet 332 addressed to node A 310. Switch 305 forwards REQ packet 333 to node A 310. Node A 310 responds with an ACK packet that switch 305 forwards to client 300 (ACK packets 335 and 335).

Node A 310 parses the client request and determines that node B should handle the request. Node A therefore commences connection handoff processing 340 to establish a new connection with node B 320 and commences handoff processing of the request to node B. Node A 310 opens a second connection (c2) to node B with a maximum segment size (MSS) equal to the first connection MSS and sends SYN packet 342 to node B 320 through switch 320. Node B 320 responds by sending SYN/ACK packet 344 back to node A 310. Node A 310 sends ACK packet 346 to node B 320. Node A 310 then forwards REQ packet 348 to node B on the second connection (c2). Node B 320 responds to node A 310 with ACK packet 350. Node A 310 sends HAND packet 352 to switch 305 requesting a handoff of the connection from node A 310 to node B 320. Switch 305 receives the handoff request and splices the first and second connections (c1<-> c2) by updating network address mapping tables (see FIG. 2 for example tables). Switch 305 sends FIN packet 354 to node A 310 so that node A will close its end of the connection with node B (i.e., the second connection (c2)). Node A 310 sends FIN/ACK packet 356 back to switch 305 acknowledging the request to close the second connection (c2). The switch intercepts FIN packet on (c2) and completes (c2) link shutdown with node A without notifying node B. Switch 305 sends ACK packet 358 back to node A. Node A closes its end of the first connection (c1) between node A and client and sends FIN packet 360. Switch 305 intercepts the FIN packet and sends FIN/ACK packet 362 back to node A without notifying the client. The FIN/ACK packet acknowledges node A's closure of the first connection (c1) to which node A responds with ACK packet 364 back to switch 305.

Payload header manipulation processing 370 maps packets from node B, which was selected to handle the client's request, back to the client and also maps packets addressed from the client to node A to node B. Node B 320 sends requested data (RESP packet 372) back to client using the header state for the second connection (c2, i.e., the connection created between node A and node B). Switch 305 modifies the header information in packet 372 to map the (c2) header to a (c1) header and forwards packet 374 to the client. Client 300 receives packet and sends acknowledgement packet 376 using the header state for the first connection (c1, i.e., the connection originally created between the client and node A). The switch then performs the reverse operation of modifying the header information in packet 376 to map the (c1) header to a (c2) header and forwards resulting packet 378 to node B 320. Data exchange continues between the client and node B in the manner described above. In addition, other requests received by node B may be handed off to other nodes in a similar fashion as node A handed off the connection to node B as described above.

Connection cleanup processing 380 commences when the client and node B are finished using the connection. Client closes connection the first connection (c1) and sends FIN packet 382. Switch 305 intercepts the FIN packet and transforms the (c1) header to a (c2) header and forwards the transformed packet (484) to node B 320. Node B receives the close request and acknowledges it by sending FIN/ACK packet 386 back to client over the second connection (c2). The switch transforms the (c2) header to a (c1) header and forwards transformed FIN/ACK packet 388 to the client. Client 300 receives and acknowledges the close request by sending ACK packet 390 back to node B over the first connection (c1). Switch 305 transforms the final close message to a (c2) header format and forwards to node B. After forwarding the final close message, the switch removes the translation data regarding (c1) and (c2) from the level 1 and level 2 mapping tables and cleans up the connections. Node B 320 receives the close acknowledgement and cleans up its end of connection (c2).

Figure 4:
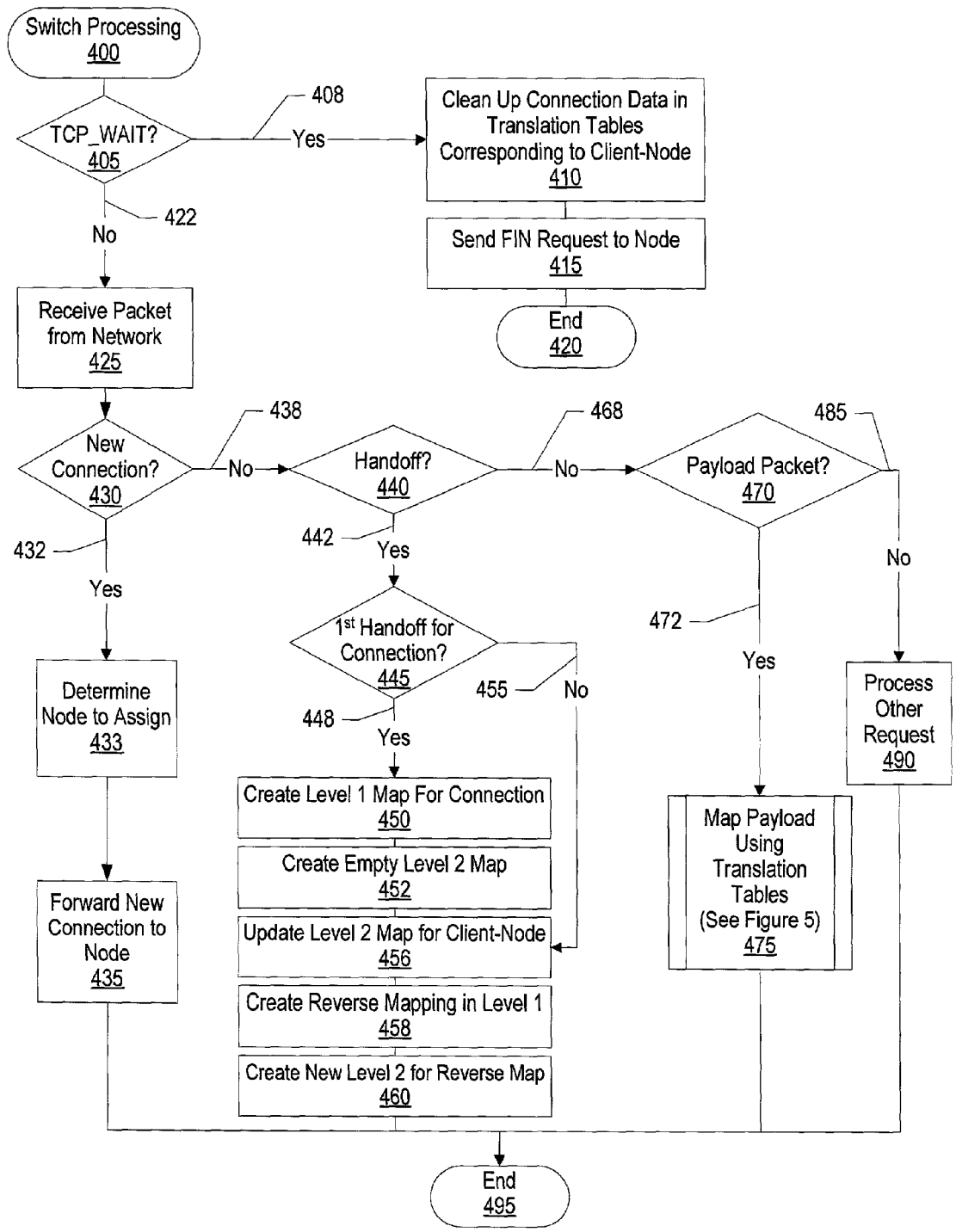
FIG. 4 is a flowchart showing switch processing.

FIG. 4 is a flowchart showing switch processing. Processing commences at 400 whereupon the routine determines whether a TCP_WAIT event has occurred (decision 405). A TCP_WAIT event occurs on a connection when a timeout occurs on the connection. If a TCP_WAIT event occurred, decision 405 branches to "yes" branch 408 whereupon connection data corresponding to the client-node connection are cleaned up (step 410, see FIG. 2 for example connection data), a close (FIN) request is sent to the corresponding node (step 415), and processing ends at 420.

On the other hand, if a TCP_WAIT event did not occur, decision 405 branches to "no" branch 422 in order to process the packet. The packet is received from the network, such as the Internet (step 425). A determination is made as to whether the packet is requesting a new connection (decision 430). If the packet is requesting a new connection, decision 430 branches to "yes" branch 432 whereupon the request is processed. The switch determines a node to assign the request (step 433), using a distribution scheme that scatters new connection requests to various nodes, such as a round-robin approach. The packet is then forwarded to the assigned node (step 435). Processing thereafter ends at 495.

If the packet was is not a request for a new connection, decision 430 branches to "no" branch 438 whereupon a determination is made as to whether the packet is a handoff request (decision 440). If the packet is a handoff request, decision 440 branches to "yes" branch 442 to process the handoff. A determination is made (decision 445) as to whether the requested handoff is the first handoff for the connection (i.e., whether there is already a level 1 mapping entry). If the handoff is the first handoff for the connection, decision 445 branches to "yes" branch 448 whereupon a level 1 mapping entry is created for the connection (step 450), and an empty level 2 mapping table is created to store handoff information regarding the connection (step 452, see FIG. 2 for examples of level 1 and level 2 mapping tables). If the handoff is not the first handoff for the connection (i.e., the level 1 entry for the connection and a corresponding level 2 mapping table already exist), then decision 445 branches to "no" branch 455 bypassing the steps used to create the level 1 entry and the level 2 mapping table.

The level 2 mapping table for the client-node is updated with an entry detailing the handoff (step 456, see FIG. 2 for example level 2 mapping entries). The level 2 mapping entry includes sequence and acknowledgment information as well as information regarding the new destination node. A reverse mapping entry is created in the level 1 mapping table (step 458, see entries 214 and 216 in FIG. 2 for example reverse mapping entries). A new level 2 mapping table is created with an entry mapping the reverse mapping destination address and port back to the client (step 460, see level 2 mapping tables 240 and 260 in FIG. 2 for examples).

On the other hand, if the received packet is not a handoff request, decision 440 branches to "no" branch 468 whereupon a determination is made as to whether the packet is a payload packet (decision 470). If the packet is a payload packet, decision 470 branches to "yes" branch 472 whereupon the payload is mapped using the switch's translation tables (predefined process 465, see FIG. 5 for further details), and processing ends at 495.

Finally, if the packet is not a payload packet, decision 470 branches to "no" branch 485 whereupon the other packet request is processed (step 490) and processing ends at 495.

Figure 5:
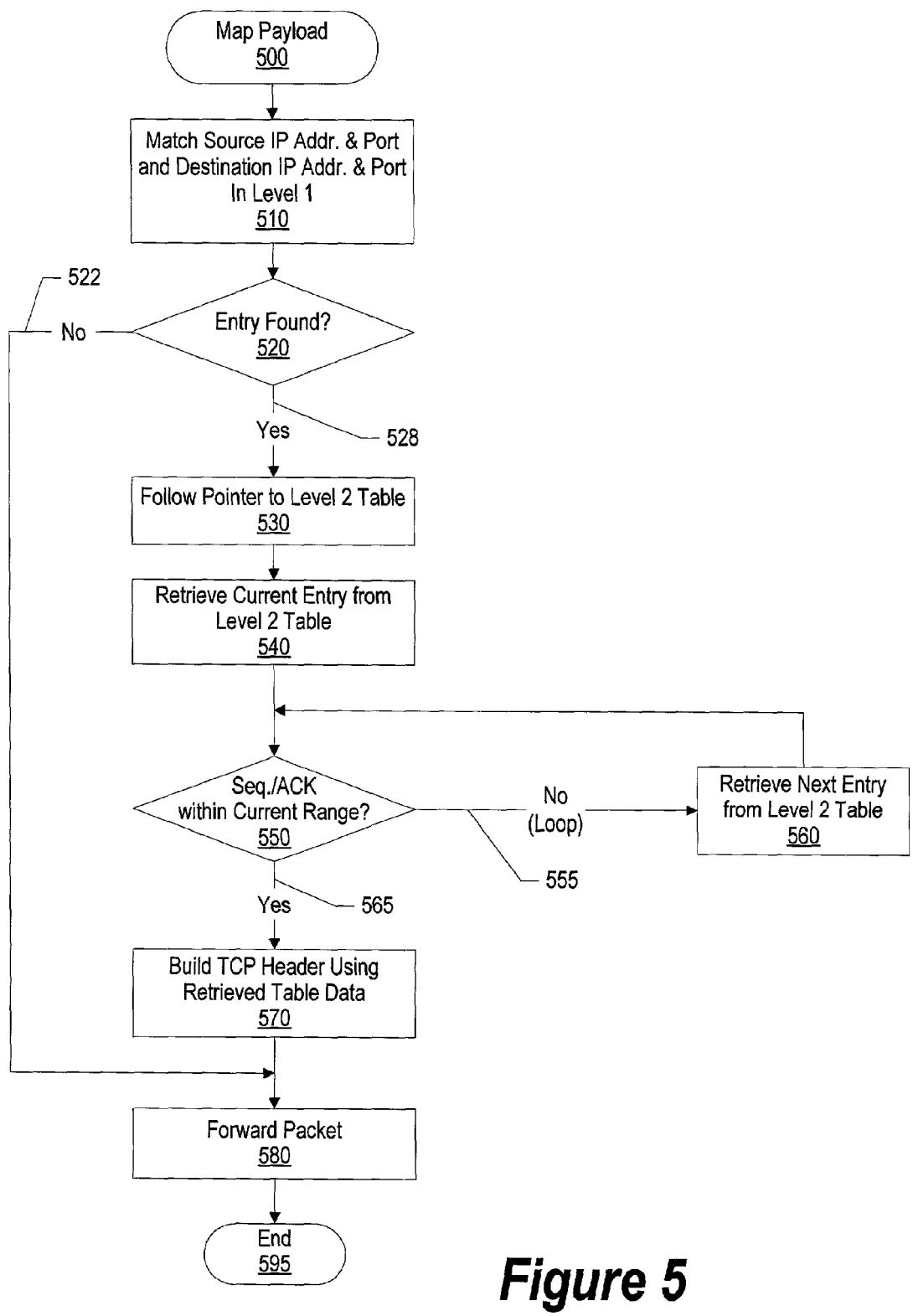
FIG. 5 is a flowchart showing the process of mapping a payload to a handling node.

FIG. 5 is a flowchart showing the process of mapping a payload to a handling node. Processing commences at 500 whereupon the switch matches the source IP address, source port number, destination IP address, and destination port number found in the received packet with corresponding addresses and port numbers found in the level 1 mapping table (step 510, see level 1 mapping table 200 in FIG. 2 for details regarding information stored in the level 1 mapping table). A determination is made as to whether a matching level 1 entry was found (decision 520). If a matching decision was not found, decision 520 branches to "no" branch 522 which bypasses mapping steps and forwards the packet on to the destination node specified in the packet (step 580) whereupon processing ends at 595.

On the other hand, if a matching entry was found in the level 1 mapping table, decision 520 branches to "yes" branch 528 whereupon the pointer found in the matching entry is followed to the corresponding level 2 mapping table (step 530, see FIG. 2 for example pointers that point to level 2 mapping tables). The current entry is retrieved from the level 2 mapping table (step 540). In one embodiment, the current entry is the first entry in the level 2 mapping table in order to provide efficient processing with older entries following.

A determination is made as to whether the sequence/acknowledgement numbers found in the packet are within the sequence/acknowledgement numbers found in the current entry (step 550, see FIG. 2 for example sequence/acknowledgement numbers in level 2 mapping tables). If the sequence/acknowledgement numbers in the packet are not within the range of the current entry, decision 550 branches to "no" branch 555 which retrieves the next entry from the level 2 mapping table (step 560) and loops back to determine whether the packet's sequence/acknowledgement numbers are within the range of the next level 2 mapping entry (decision 550). This looping continues until the sequence/acknowledgement numbers in the packet are within range of one of the entries, at which time decision 550 branches to "yes" branch 565.

In one embodiment, if none of the entries in the level 2 mapping table have a range corresponding to the sequence/acknowledgement numbers found in the packet, the destination node found in the packet is used. In this manner, the destination information for the original node in the connection is not written to the level 2 mapping table as this destination information is already included in the packet received from the client.

A TCP header for the packet is built using the node data retrieved from the level 2 mapping table (step 570) and the received packet is forwarded to a node using the created TCP header (step 580). Processing thereafter ends at 595.

Figure 6:
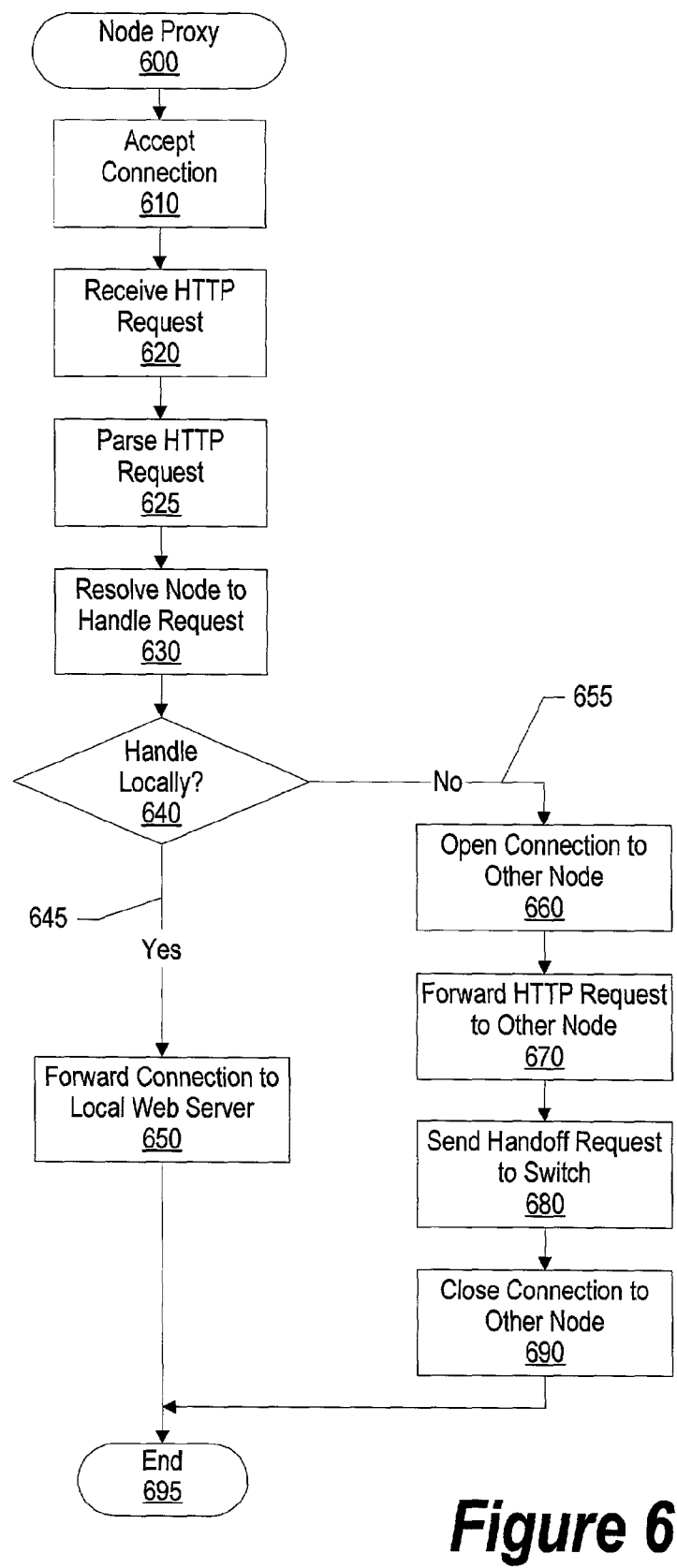
FIG. 6 is a flowchart showing proxy processing performed by a node to distribute requests to other nodes.

FIG. 6 is a flowchart showing proxy processing performed by a node to distribute requests to other nodes. A node proxy is a process that analyzes incoming requests and determines whether the node (i.e., server, computer system, etc.) within which the node proxy operates should handle the request or whether the request should be handed off to another node for processing.

Processing commences at 600 whereupon the node proxy accepts the connection from the client that was distributed to the node by a switch (step 610). The request, such as an HTTP request, is received (step 620). The request is parsed to determine what information is called for by the request (step 630). The node proxy determines which node should handle the request based upon the parsed request and the availability and capability of the various nodes (step 630).

A determination is made as to whether the node should handle the request or pass the request to another node (decision 640). If the node will handle the request locally, decision 640 branches to "iyes" branch 645 whereupon the connection is forwarded to the local web server for processing (step 650). Processing thereafter ends at 695.

On the other hand, if the request will not be handled locally (i.e., the request will be handed off to another node for handling), decision 640 branches to "no" branch 655 whereupon a new connection is opened to the other node (step 660). The client's request is forwarded to the other node using the newly created connection (step 670). A handoff request is sent to the switch requesting that the connection be spliced to the other node (step 680). The node executing the proxy application closes its end of the newly created connection to the other node (step 690), and processing thereafter ends at 695.

Figure 7:
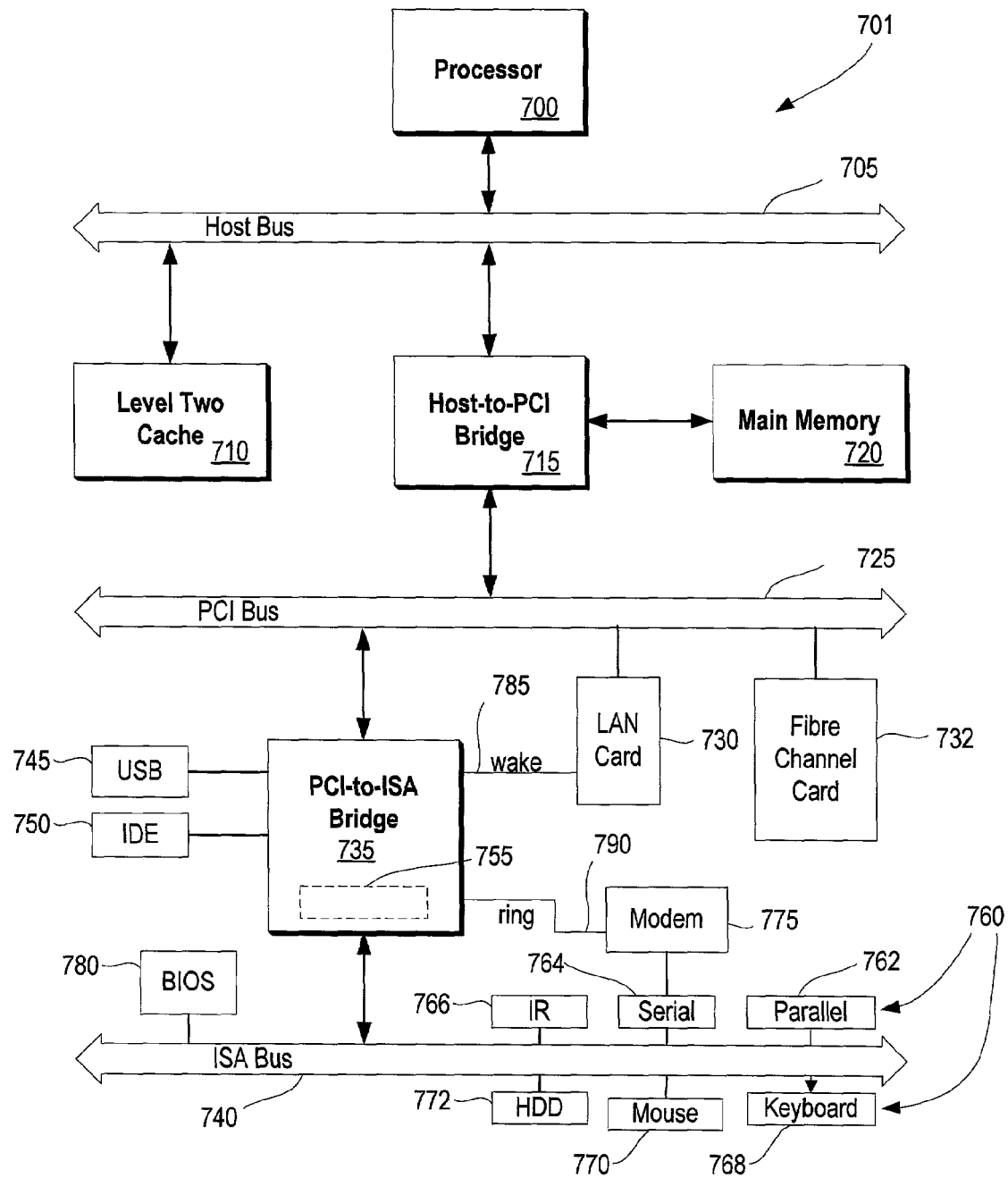
FIG. 7 is a block diagram of an information handling system capable of implementing the present invention.

FIG. 7 illustrates information handling system 701 which is a simplified example of a computer system capable of performing the computing operations described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 825 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

Figure 8:
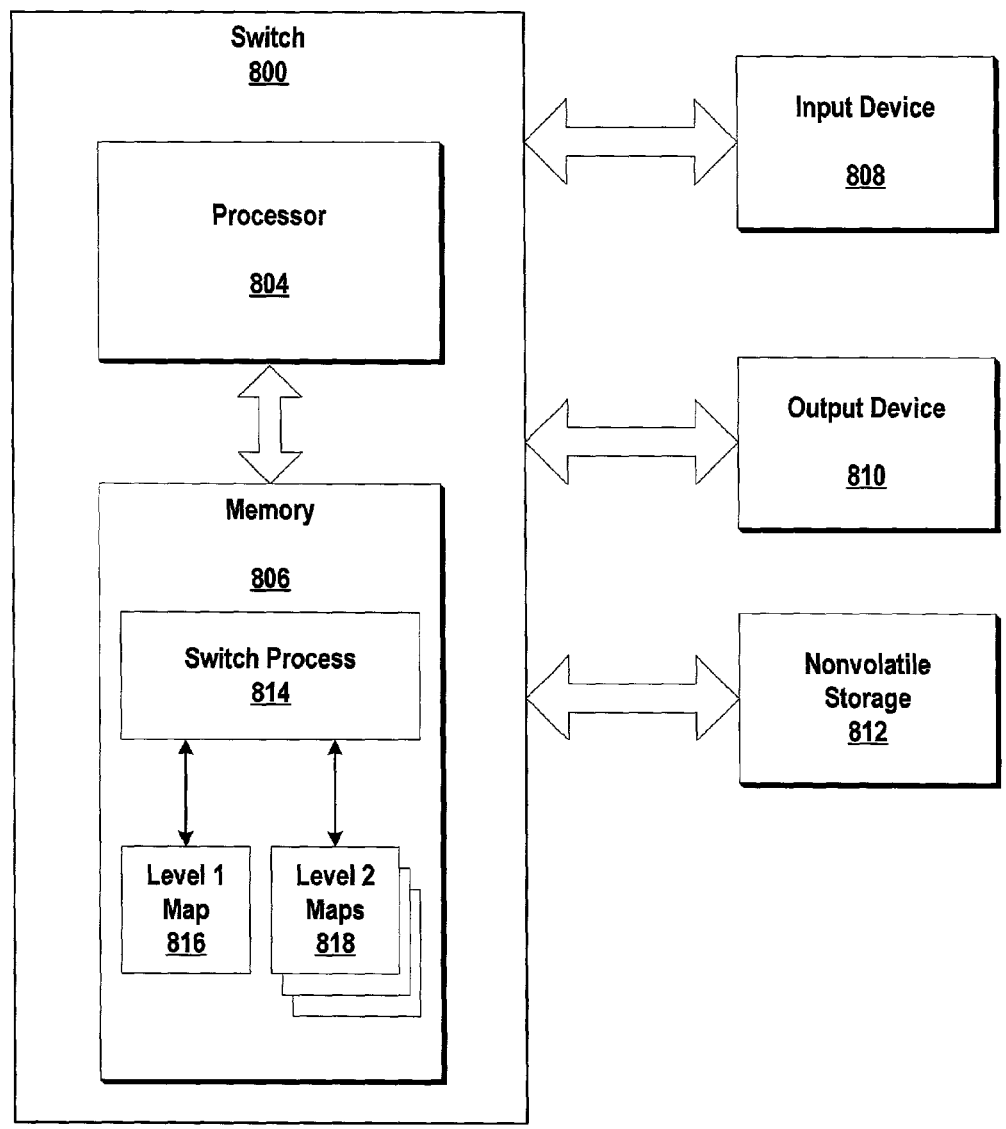
FIG. 8 is a block diagram of a router capable of implementing the present invention.

FIG. 8 illustrates switch 800 which is a simplified example of a switch capable of performing the switching operations described herein. Switch 800 is shown include a processor, or processors 804, and a memory 806. Switch management process 814 is shown to be resident in memory 806 and manages level 1 map 816 and level 2 maps 818. Level 1 map 816 and level 2 maps 818 include connection splicing data used and stored by switch process 814 to manage connection splices through switch 800. An input device 808 and an output device 810 are connected to computer system 802 and represent a wide range of varying I/O devices such as disk drives, keyboards, modems, network adapters, printers and displays. Nonvolatile storage device 812, includes a disk drive, nonvolatile memory, optical drive, or any other nonvolatile storage device, is shown connected to computer system 802.

While the switch described in FIG. 8 is capable of executing the invention described herein, this device is simply one example of a switch. Those skilled in the art will appreciate that many other switch designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for splicing network connections, said method comprising:
    receiving a first handoff request from a first node corresponding to a first node identifier, wherein the first node is connected to a client node using a first connection;
    identifying a second node based on a second node identifier, wherein the second node is connected to the first node using a second connection;
    updating one or more connection tables with data corresponding to the first and second connections, wherein the connection tables include a first mapping table and a reverse mapping table;
    redirecting one or more client packets sent over the first connection from the client node to the second node in response to the updated connection tables;
    writing a first reverse mapping entry to the first mapping table, the first reverse mapping entry including the second node identifier, the first node identifier and a pointer to the reverse mapping table; and
    writing a second reverse mapping entry in the reverse mapping table, the reverse mapping entry including the client node identifier.

2. The method as described in claim 1 wherein the updating further comprises:
    writing a first entry to the first mapping table, the first entry including the client node identifier, the first node identifier, and a pointer to a second mapping table;
    creating the second mapping table; and
    writing a second entry in the second mapping table, the second entry including the second node identifier.

3. The method as described in claim 2 further comprising:
    writing a third entry in the second mapping table in response to receiving a second handoff request, the third entry identifying a third node, wherein the second entry includes a first handoff sequence value corresponding to the first handoff request and wherein the third entry includes a second handoff sequence value corresponding to the second handoff request;
    receiving a request from the client, the request including a request sequence value corresponding to the request; and
    redirecting the request to the third node in response to the request sequence value being greater than or equal to the second handoff sequence value.

4. The method as described in claim 3 further comprising:
    redirecting the request to the second node in response to the request sequence value being greater than or equal to the first handoff sequence value and less than the second handoff sequence value.

5. The method as described in claim 1 further comprising:
    receiving a packet from the second node that includes a destination address identifying the first node;
    matching the packet to the first reverse mapping entry;

retrieving the client node identifier from the reverse mapping table in response to the matching; and changing the destination address to identify the client node identifier.

6. The method as described in claim 1 further comprising:

redirecting one or more response packets sent by the second node over the second connection to the client node in response to the updated tables.

7. An information handling system comprising:

one or more processors;

a memory accessible by the processors;

a network interface connecting the information handling system to a computer network; and a connection splicing tool for splicing connections between nodes, the connection splicing tool including:

means for receiving a first handoff request from a first node, wherein the first node is connected to a client node using a first connection over the computer network;

means for identifying a second node based on a second node identifier, wherein the second node is connected to the first node using a second connection over the computer network;

means for updating one or more connection tables with data corresponding to the first and second connections, wherein the connection tables include a first mapping table and a reverse mapping table;

means for redirecting one or more client packets sent over the first connection from the client node to the second node in response to the updated connection tables;

means for writing a first reverse mapping entry to the first mapping table, the first reverse mapping entry including the second node identifier, the first node identifier and a pointer to the reverse mapping table; and means for writing a second reverse mapping entry in the reverse mapping table, the reverse mapping entry including the client node identifier.

8. The information handling system as described in claim 7 wherein the means for updating further comprises:

means for writing a first entry to the first mapping table stored in the memory, the first entry including the client node identifier, the first node identifier, and a pointer to a second mapping table stored in the memory;

means for creating the second mapping table; and means for writing a second entry in the second mapping table, the second entry including the second node identifier.

9. The information handling system as described in claim 9 further comprising:

means for writing a third entry in the second mapping table in response to receiving a second handoff request, the third entry identifying a third node connected to the computer network, wherein the second entry includes a first handoff sequence value corresponding to the first handoff request and wherein the third entry includes a second handoff sequence value corresponding to the second handoff request;

means for receiving a request from the client over the computer network, the request including a request sequence value corresponding to the request; and means for redirecting the request to the third node in response to the request sequence value being greater than or equal to the second handoff sequence value.

10. The information handling system as described in claim 9 further comprising:

means for redirecting the request to the second node in response to the request sequence value being greater than or equal to the first handoff sequence value and less than the second handoff sequence value.

11. The information handling system as described in claim 7 further comprising:

means for receiving a packet from the second node over the computer network, the packet including a destination address identifying the first node;

means for matching the packet to the first reverse mapping entry;

means for retrieving the client node identifier from the reverse mapping table in response to the matching; and means for changing the destination address to identify the client node identifier.

12. The information handling system as described in claim 7 further comprising:

means for redirecting one or more response packets sent by the second node over the second connection to the client node in response to the updated tables.

13. A computer program product stored in a computer operable media for splicing network connections, said computer program product comprising:

means for receiving a first handoff request from a first node, wherein the first node is connected to a client node using a first connection;

means for identifying a second node based on a second node identifier, wherein the second node is connected to the first node using a second connection;

means for updating one or more connection tables with data corresponding to the first and second connections, wherein the connection tables include a first mapping table and a reverse mapping table;

means for redirecting one or more client packets sent over the first connection from the client node to the second node in response to the updated connection tables;

means for writing a first reverse mapping entry to the first mapping table, the first reverse mapping entry including the second node identifier, the first node identifier and a pointer to the reverse mapping table; and means for writing a second reverse mapping entry in the reverse mapping table, the reverse mapping entry including the client node identifier.

14. The computer program product as described in claim 13 wherein the means for updating further comprises:

means for writing a first entry to the first mapping table, the first entry including the client node identifier, the first node identifier, and a pointer to a second mapping table;

means for creating the second mapping table; and means for writing a second entry in the second mapping table, the second entry including the second node identifier.

15. The computer program product as described in claim 14 further comprising:

means for writing a third entry in the second mapping table in response to receiving a second handoff request, the third entry identifying a third node, wherein the second entry includes a first handoff sequence value corresponding to the first handoff request and wherein the third entry includes a second handoff sequence value corresponding to the second handoff request;

means for receiving a request from the client, the request including a request sequence value corresponding to the request; and means for redirecting the request to the third node in response to the request sequence value being greater than or equal to the second handoff sequence value.

16. The computer program product as described in claim 15 further comprising:

means for redirecting the request to the second node in response to the request sequence value being greater than or equal to the first handoff sequence value and less than the second handoff sequence value.

17. The computer program product as described in claim 13 further comprising:

means for receiving a packet from the second node that includes a destination address identifying the first node;
means for matching the packet to the first reverse mapping entry;
means for retrieving the client node identifier from the reverse mapping table in response to the matching; and
means for changing the destination address to identify the client node identifier.

18. The method as described in claim 1 further comprising:

recording a sequence range corresponding to the first handoff request;
receiving a packet from the client node, the packet including a sequence value;
performing the redirecting only if the packet's sequence value is within the sequence range.

19. The information handling system as described in claim 7 further comprising:

means for recording a sequence range corresponding to the first handoff request;
means for receiving a packet from the client node, the packet including a sequence value;
means for performing the redirecting only if the packet's sequence value is within the sequence range.

20. The computer program product as described in claim 13 further comprising:

means for recording a sequence range corresponding to the first handoff request;
means for receiving a packet from the client node, the packet including a sequence value;
means for performing the redirecting only if the packet's sequence value is within the sequence range.

* * * * *

UNITED STATES PATENT AND TRADEMARK OFFICE
CERTIFICATE OF CORRECTION

PATENT NO. : 7,000,027 B2 Page 1 of 1
APPLICATION NO. : 09/998048
DATED : February 14, 2006
INVENTOR(S) : Hensbergen It is certified that error appears in the above-identified patent and that said Letters Patent is hereby corrected as shown below:

Claim 9, column 13, line 53, please delete "9" and insert --8--.

Signed and Sealed this

Eighth Day of August, 2006

JON W. DUDAS
*Director of the United States Patent and Trademark Office*